(12) United States Patent
Levine (10) Patent No.: US 7,266,562 B2
(45) Date of Patent: Sep. 4, 2007

(54) SYSTEM AND METHOD FOR AUTOMATICALLY CATEGORIZING OBJECTS USING AN EMPIRICALLY BASED GOODNESS OF FIT TECHNIQUE

(76) Inventor: Joel H. Levine, 368 Shaker Blvd., Enfield, NH (US) 03748

( * ) Notice: Subject to any disclaimer, the term of this patent is extended or adjusted under 35 U.S.C. 154(b) by 0 days.

(21) Appl. No.: 11/057,903

(22) Filed: Feb. 14, 2005

(65) Prior Publication Data

US 2006/0184479 A1    Aug. 17, 2006

(51) Int. Cl.
*G06F 17/30* (2006.01)
(52) U.S. Cl. .............................. 707/101; 707/5; 707/6
(58) Field of Classification Search .................. 707/6, 707/5
See application file for complete search history.

(56) References Cited

U.S. PATENT DOCUMENTS

| | | | |
|---|---|---|---|
| 6,182,066 B1 * | 1/2001 | Marques ........................ | 707/5 |
| 6,621,930 B1 * | 9/2003 | Smadja ....................... | 382/224 |
| 6,732,157 B1 | 5/2004 | Gordon et al. ............. | 709/206 |
| 7,003,517 B1 * | 2/2006 | Seibel et al. .................. | 707/6 |
| 2003/0135499 A1 * | 7/2003 | Schirmer et al. ............. | 707/6 |

OTHER PUBLICATIONS

*Issue 107: A Statistical Approach to the Spam Problem*, Gary Robinson, Mar. 1, 2003; pp. 1-8; *Linux Journal*; http://www.linuxjournal.com/article.php?sid=6467.

*Better Bayesian Filtering*, Paul Graham, Jan. 2003, pp. 1-10; http://www/paulgraham.com/better.html.

*A Plan for Spam*, Paul Graham, Aug. 2002, pp. 1-12; http://www.paulgraham.com/spam.html.

*Data Without (Operational) Variable*, Joel H. Levine, Aaron Klein and James Mathews, *Journal of Mathematical Sociology*, 2001, vol. 25(3), pp. 225-273.

*Handling Redundancy in Email Token Probabilities*, Gary Robinson, Apr. 29, 2004, pp. 1-10.

* cited by examiner

*Primary Examiner*—Tim Vo
*Assistant Examiner*—Olubusola Oni
(74) *Attorney, Agent, or Firm*—Downs Rachlin Martin PLLC

(57) ABSTRACT

One or more working objects (106), e.g., email messages and texts, are categorized into one or more of a plurality of categories (112A, 112B) based on the content/attributes of each working object versus the content/attributes of objects already categorized. A category profile (154A, 154B) is created for each category from a plurality of training objects (142) known to be categorized under that category. An object profile (124C) is created for each working object. Each working object profile is then compared to each of the category profiles to determine information regarding goodness-of-fit of that object profile to each of the category profiles. The corresponding working object is categorized based on this goodness-of-fit information.

28 Claims, 9 Drawing Sheets

| Word | Document #1 | #2 | #3 | #4 | #5 | #6 | #7 | #8 | #9 | #10 | ... |
|---|---|---|---|---|---|---|---|---|---|---|---|
| $100 | .000 | .000 | .000 | .000 | .000 | .000 | .000 | .000 | .002 | .000 | |
| $200 | .000 | .000 | .000 | .000 | .000 | .000 | .000 | .000 | .002 | .000 | |
| 114 | .000 | .017 | .004 | .007 | .000 | .000 | .000 | .000 | .000 | .000 | |
| 200 | .000 | .000 | .004 | .000 | .000 | .000 | .000 | .000 | .000 | .000 | |
| 26 | .000 | .000 | .000 | .000 | .000 | .000 | .000 | .000 | .002 | .000 | |
| 29 | .000 | .000 | .000 | .000 | .000 | .029 | .000 | .000 | .000 | .000 | |
| 4 | .000 | .000 | .000 | .000 | .000 | .000 | .000 | .000 | .002 | .000 | |
| 5419 | .000 | .000 | .000 | .000 | .000 | .000 | .000 | .000 | .002 | .000 | |
| 9.92ZIJOZYE5WK7 | .000 | .000 | .004 | .000 | .000 | .000 | .000 | .000 | .002 | .000 | |
| 9 K | .000 | .000 | .004 | .000 | .000 | .000 | .000 | .000 | .000 | .000 | |
| ABSOLUTELY | .000 | .000 | .000 | .000 | .000 | .000 | .000 | .000 | .002 | .000 | |
| ACMU8KF | .000 | .000 | .000 | .000 | .000 | .000 | .000 | .004 | .000 | .000 | |
| AD | .000 | .000 | .004 | .000 | .000 | .000 | .000 | .000 | .000 | .000 | |
| AHEAD | .000 | .000 | .000 | .000 | .000 | .000 | .000 | .004 | .000 | .000 | |
| ANSWER | .000 | .000 | .000 | .000 | .000 | .000 | .000 | .000 | .002 | .000 | |
| AREAS | .000 | .000 | .000 | .007 | .000 | .000 | .000 | .000 | .000 | .000 | |
| ASKING | .000 | .000 | .000 | .000 | .000 | .000 | .000 | .000 | .002 | .000 | |
| ASP | .000 | .000 | .004 | .000 | .000 | .000 | .000 | .000 | .000 | .000 | |
| AUDIO | .000 | .000 | .000 | .000 | .000 | .000 | .000 | .000 | .004 | .000 | |
| AWAY | .000 | .000 | .000 | .000 | .000 | .000 | .000 | .004 | .000 | .000 | ... |
| BEFORE | .000 | .000 | .000 | .000 | .000 | .000 | .000 | .000 | .002 | .000 | |
| BIN | .000 | .000 | .000 | .000 | .000 | .000 | .000 | .004 | .000 | .000 | |
| BORDER | .000 | .000 | .000 | .000 | .000 | .000 | .000 | .004 | .000 | .000 | |
| BOTTLE | .000 | .000 | .000 | .007 | .000 | .000 | .000 | .000 | .000 | .000 | |
| BROADER | .000 | .009 | .000 | .000 | .000 | .000 | .000 | .000 | .000 | .000 | |
| BUY | .000 | .000 | .000 | .000 | .000 | .000 | .000 | .000 | .002 | .000 | |
| CAMP | .000 | .000 | .000 | .000 | .000 | .000 | .000 | .004 | .000 | .000 | |
| CAPITAL | .000 | .000 | .000 | .000 | .000 | .000 | .000 | .000 | .002 | .000 | |
| CARTER | .000 | .009 | .000 | .007 | .000 | .000 | .000 | .000 | .000 | .000 | |
| CLEAN | .000 | .009 | .000 | .000 | .000 | .000 | .000 | .000 | .000 | .000 | |
| COMING | .000 | .000 | .000 | .000 | .000 | .000 | .000 | .004 | .000 | .000 | |
| COMPANIES | .000 | .000 | .004 | .000 | .000 | .000 | .000 | .000 | .000 | .000 | |
| COMPUTATION | .000 | .000 | .000 | .000 | .000 | .000 | .000 | .004 | .000 | .000 | |
| CONSULTING | .000 | .000 | .000 | .000 | .000 | .000 | .054 | .000 | .000 | .000 | |
| CORRECTLY | .000 | .000 | .000 | .000 | .000 | .000 | .000 | .000 | .002 | .000 | |
| CORRESPONDENCE | .000 | .009 | .000 | .000 | .000 | .000 | .000 | .000 | .002 | .000 | |
| COULDN'T | .000 | .000 | .000 | .000 | .000 | .000 | .000 | .000 | .002 | .000 | |
| CRAZY | .000 | .000 | .000 | .000 | .000 | .000 | .000 | .000 | .008 | .000 | |
| CS | .000 | .000 | .000 | .000 | .000 | .000 | .000 | .000 | .004 | .000 | |
| CSTONE | .000 | .000 | .000 | .000 | .000 | .000 | .000 | .000 | .002 | .000 | |
| DAILY | .000 | .000 | .000 | .000 | .000 | .000 | .000 | .000 | .002 | .000 | |

FIG.5

Goodness of fit = 500

$$\sum_{\substack{\text{all items } i \text{ and} \\ \text{all messages } m \\ \text{for all categories } c}} \begin{cases} \dfrac{(\text{message profile}_{i,m,c} - \text{category profile}_{i,c})^2}{\text{category profile}_{i,c}}, & \text{category profile}_{i,c} > .0 \\ .0001, & \text{category profile}_{i,c} \leq .001, \text{message profile}_{i,m,c} = 0 \\ 1,000, & \text{category profile}_{i,c} \leq .001, \text{message profile}_{i,m,c} > 0 \end{cases}$$

| Recipient's Classification Training 854 | Estimate: Not Spam | Estimate: Spam |
|---|---|---|
| Not Spam | 318 | 0 |
| Spam | 0 | 536 |

| Recipient's Classification Test: 276 Documents | Estimate: Not Spam | Estimate: Spam |
|---|---|---|
| Not Spam | 76 | 0 (false positive) |
| Spam | 14 (6.5% false negatives) | 186 |

| | | |
|---|---|---|
| 0.0811038 | 0.0167485 | COM |
| 0.0494492 | 0.0012592 | HTML |
| 0.0223621 | 0.0000000 | LNIS |
| 0.0174630 | 0.0022207 | SUN |
| 0.0198677 | 0.0058514 | YAHOO |
| 0.0155710 | 0.0028850 | FREE |
| 0.0126501 | 0.0000000 | VTARGET |
| 0.0125329 | 0.0000000 | CBI |
| 0.0122945 | 0.0000000 | MAILCENTER |
| 0.0130367 | 0.0011270 | ERRORS |

FIG.9B

| | | |
|---|---|---|
| 0.0010330 | 0.0010288 | UPDATES |
| 0.0010257 | 0.0010218 | SIX |
| 0.0010337 | 0.0010298 | COUNT |
| 0.0010495 | 0.0010460 | ORIGINATOR |
| 0.0010157 | 0.0010123 | TRUE |
| 0.0010362 | 0.0010331 | REQUESTING |
| 0.0010363 | 0.0010333 | SERIOUS |
| 0.0010996 | 0.0010968 | DELETE |
| 0.0010460 | 0.0010437 | 404 |
| 0.0010173 | 0.0010149 | LISTEN |

FIG.9C

| | | |
|---|---|---|
| 0.0010182 | 0.0086292 | THANKS |
| 0.0010013 | 0.0087535 | COLUMBIA |
| 0.0049874 | 0.0133411 | THAT |
| 0.0011394 | 0.0099965 | MY |
| 0.0000000 | 0.0097446 | ALLAN |
| 0.0125096 | 0.0229387 | OF |
| 0.0000000 | 0.0115445 | BETTE |
| 0.0115260 | 0.0248981 | EDU |
| 0.0122978 | 0.0288890 | I |
| 0.0200812 | 0.0387364 | THE |

FIG. 10

Goodness of fit =

$$\sum_{\substack{\text{all items } i \text{ and} \\ \text{all messages } m \\ \text{for all categories } c}} \begin{cases} 2 \times \text{message profile}_{i,m,c} \times \log\left(\dfrac{\text{message profile}_{i,m,c}}{\text{category profile}_{i,c}}\right), \text{category profile}_{i,c} > .0 \\ .0001, \text{category profile}_{i,c} \leq .001, \text{message profile}_{i,m,c} = 0 \\ 1,000, \text{category profile}_{i,c} \leq .001, \text{message profile}_{i,m,c} > 0 \end{cases}$$

| Recipient's Classification Training 854 Documents | Estimate: Not Spam | Estimate: Spam |
|---|---|---|
| Not Spam | 318 | 0 |
| Spam | 1 | 535 |

| Recipient's Classification Test: 276 Documents | Estimate: Not Spam | Estimate: Spam |
|---|---|---|
| Not Spam | 66 | 10 ( 13% false positives) |
| Spam | 9 ( 4.5% false neg. ) | 191 |

SYSTEM AND METHOD FOR AUTOMATICALLY CATEGORIZING OBJECTS USING AN EMPIRICALLY BASED GOODNESS OF FIT TECHNIQUE

FIELD OF THE INVENTION

The present invention generally relates to the field of classification. In particular, the present invention is directed to a system and method for automatically categorizing objects using an empirically based goodness of fit technique.

BACKGROUND OF THE INVENTION

Automatic categorizing of texts based on content generally begins with a list of key words and typically follows one of three general strategies, i.e., a vector space strategy, a statistical strategy and a Bayesian strategy.

Vector Space Strategy

The vector space strategy generally reduces each text to a set of counts, e.g., counts of key words appearing in the text. Following this strategy, the counts, organized as vectors, are subjected to standard mathematical devices used to define properties relating to the vectors, such as the distance between any two vectors or the angle between any two vectors. These distances or angles become the starting point for assigning centers to known categories and for estimating similarity between an uncategorized text and the known categories of texts. An important point is that key mechanisms of the vector space strategy are borrowed from well-known mathematics. The empirical validity of the particular mathematical devices used as models of texts is assumed without investigation.

Vector models, like singular value decomposition, substitute mathematical assumptions for empirically derived models of text. Where each text might be represented by a vector, such as a vector of counts or a vector of proportions, the measure of association between such vectors (or between such vectors and vectors that represent categories) is derived from implicit mathematical assumptions, usually assuming that the space in which the vectors are embedded is Euclidean That is, where the association between two vectors is represented by the cosine of the angle between them, this representation (if it uses the conventional Euclidean definition of a cosine) assumes a Euclidean space. Similarly, where the association between two vectors is represented by the length of a difference vector, this "length" typically assumes a Euclidean space. By failing to test the validity of their assumptions against data, the vector space techniques incorporate error or, at the least, untested assumptions, into their devices for producing categories. For example, where "distance" per se is capable of many realizations, these models usually assume Euclidean distance and Euclidean angles. These are assumptions that new research has shown to be in error. In contrast, the strategy of the present invention, i.e., the "Levine strategy," makes no false geometrical or dimensional assumptions about the space under consideration, or avoids these assumptions altogether. The Levine strategy is described below in detail.

Statistical Strategy

The statistical strategy, like the vector space strategy, reduces a text to a set of counts. The statistical strategy characterizes categories of texts and heterogeneity within categories by standard statistical devices like means, sums of squared deviations, standard deviations, and standardized scores. These devices are borrowed from well known statistical procedures. Their empirical validity as descriptive devices is assumed. (These devices are essentially equivalent to the distances of the vector space strategy).

Statistical strategies substitute standard statistical devices for testable assumptions, generally using and assuming the validity of least squares and the implied means, variances, and standard deviations that are part of the least squares strategy. These are assumptions that new research has shown to be invalid relative to categorizing texts. In contrast, the Levine strategy of the present invention separates the model from statistical devices used to assess the fit of the model to the data.

Bayesian Strategy

Bayesian strategy in practice represents a document by noting the presence or absence of previously determined key words, like the key word "impotence", which is often indicative of "spam" mail. The device of the Bayesian strategy employs the logic of Bayes' theorem, which directs the computation of the probability that an uncategorized text is "caused" by (or generated by) each of the target categories—given the prior probabilities and the properties of the uncategorized document. Categorization is effected by weighted comparison of the probabilities with respect to each of the possible categories of the text.

There are at least two shortcomings of conventional implementations of the Bayesian strategy. First, Bayesian filters generally rely on probabilities that are context dependent. For example, in an email spam filter context, if a person's email is 99% spam, then the prior probability that an uncategorized message is spam is 0.99 regardless of content. For this person, the presence of the word "impotence" in a document boosts the probability that it is spam into the 0.99 to 1.0 range. For a person whose email is 1% spam, the probability that an uncategorized message is spam is 0.01 without testing for key words. For this person, the presence of the word "impotence" in a message boosts the probability into the 0.01 to 1.0 range. Thus, the true prior probabilities, as well as the cut point at which a method may be safely and reasonably estimated to have been spam, are highly variable. This places a premium on customization that is a mixed blessing for generalized applications. For example, this high variability would cause a problem for a Bayesian spam filter employed at a server level when many email users are served by the same server. What is needed is an automatic text categorizing system that does not depend on the relative proportion of spam or non-spam within the sample.

The second general problem of the Bayesian strategy lies in the gap between theory and practical application. In theory, the Bayesian strategy depends on Bayes' theorem to provide the probability that a message was spam given the presence or absence in that message of key words. The problem with this is that a theoretically correct implementation of Bayes' theorem is difficult to put into practice. If, for example, a Bayesian filter is to use n key words (reduced from the full text), the theory requires an estimate of the prior probability of spam for each of the $2^n$ compound events that correspond to combinations (present and absent) of the n key words. The theorem requires the n probabilities associated with each key word in isolation, plus the probabilities associated with each of the $n(n-1)/2$ pairs of key words in the absence of the others, plus the probabilities associated with each triple of key words, and so forth. For a value of n greater than 20, i.e., for more than 20 key words, the result is a large number of probabilities that have to be estimated.

In practice this problem is not solved. It is dealt with by assuming that key words are statistically independent. The assumption would, if correct, make the Bayesian theory practical, but it is clearly not true. For example, with spam email this assumption of statistical independence would assume that the probability associated with one of the key words, e.g., "impotence," is independent of the probability of the word "physician," and independent of the probability of the word "prescription," and are independent of the probabilities associated with the other key words. However, these words are not independent. For example, the probability of the word "physician" in a document that uses the word "impotence" is different from the probability of the word "physician" in the absence of the word "impotence." As a consequence, the probabilities used by so-called Bayesian filters are generally not the probabilities specified by Bayes' theorem.

Thus, suppose that the presence of "impotence" in a message implies a 0.9 probability that the message containing it is spam. Its presence is a good, but not certain, indicator of spam; the message could be a prescription from the person's physician. Suppose further that the presence of the word "physician" in a message implies a 0.9 probability that the message containing it is spam and that the presence of the word "prescription" implies a 0.9 probability that the message containing it is spam. Then, what more do we learn if all three key words are present? The answer is "not much," because none of these words goes far to address the ambiguities involved in the single word "impotence." They do nothing to screen out the possibility that the message is a prescription from the person's physician. The probabilities are not independent. The probability that the message with all three key words present is spam is only slightly improved as compared to the probability associated with any one of the key words.

But the Bayesian filters, contrary to fact (for the sake of computational simplicity), assume independence of the key words. This false assumption resolves this combination of information to a near-certainty, p=0.9986, by recourse to what Bayes' theorem would say if the three probabilities were independent corroborating evidence of spam. However, these key words are not independent, with the consequence that the probability that would be used by the so-called Bayesian filter is incorrect (too high). The true probability, which would have to be computed from the data, not from the theorem, is likely to be closer to the original 0.9 than to 0.9986. In contrast, the Levine strategy of the present invention obviates the intractable implications inherent in the logic of probabilities.

SUMMARY OF THE INVENTION

In one aspect, the present invention is directed to a method of classifying at least one working object among a plurality of categories. The method comprises the step of producing a plurality of category profiles each corresponding to a corresponding respective category of the plurality of categories. A working object profile is produced for the at least one working object. Goodness-of-fit information is determined for the working object profile relative to each of the plurality of category profiles.

In another aspect, the present invention is directed to a method of classifying at least one working object. The method comprises the steps of producing a first plurality of training object profiles corresponding to a first category and producing a second plurality of training object profiles corresponding to a second category. A first category profile is produced as a function of a plurality of training objects each belonging to the first category. A second category profile is produced as a function of a plurality of training objects each belonging to the second category. A first working object profile of the at least one first working object is produced. A first goodness-of-fit between the first working object profile and the first category profile is determined. A second goodness-of-fit of the first working object profile and the second category profile is determined. The goodness-of-fit with respect to the first object profile is compared with the goodness-of-fit with respect to the second object profile so as to categorize the at least one first object.

In yet another aspect, the present invention is directed to a system comprising an email software application operatively configured to provide a user with email functionality that includes receiving incoming new email messages. A filter is provided for filtering spam messages from the new email messages. The filter has a not spam category and a spam category and comprises a categorizing engine operatively configured to: i) produce a non-spam category profile and a spam category profile; ii) create a first object profile for a first new email message of the new email messages; iii) determine goodness-of-fit information of the first object profile relative to each of the not spam category profile and the spam category profile and iv) classify the first new email message into at least one of the not spam category and the spam category based upon the goodness-of-fit information.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION OF THE INVENTION

Figure 1:
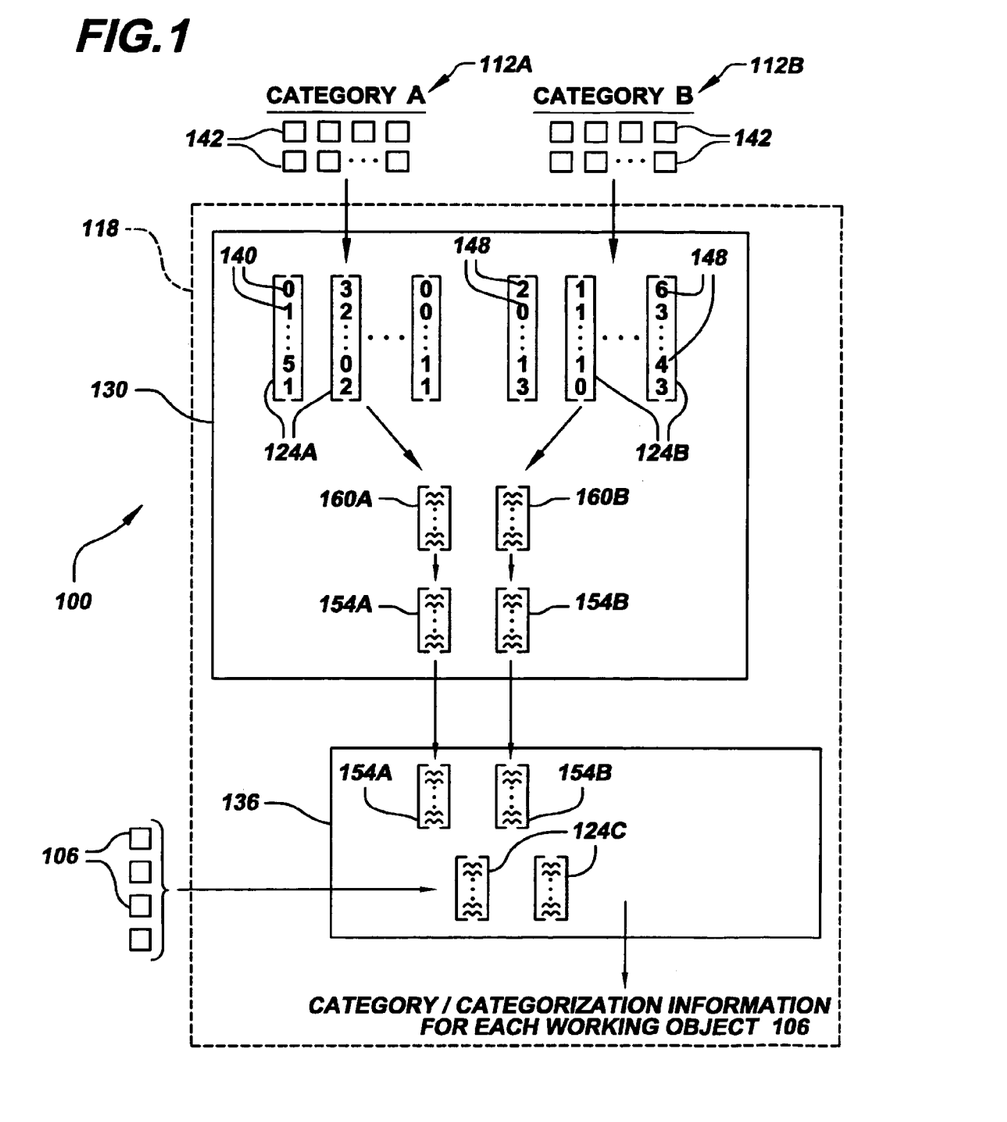
FIG. 1 is a high-level schematic diagram of an object categorizing system that includes a Levine engine of the present invention.

Referring now to the drawings, FIG. 1 shows in accordance with the present invention an automatic categorizing system, which is generally denoted by the numeral 100. In general, categorizing system 100 categorizes one or more to-be-categorized working "objects" 106 into one or more of a plurality of categories 112. The term "objects," as used herein and in the appended claims, includes, but is not restricted to, computer files, e.g., text files, image files, audio files, hybrids of these, and portions of these, such as words, phrases, and portions of image and audio files, among others, that may be categorized based on "items" (see, e.g., items 306 of FIG. 3) that can be counted. Examples of items include, but are not limited to, part of the content of an object, such as text or parts thereof (e.g., words or character strings), graphics or parts thereof (e.g., arrays of bits of a bit-mapped image), audio signals or parts thereof (e.g., patterns within an audio signal), or a set of object attributes other than its content, such as a file name, formatting information (e.g., HTML codes), and document information (e.g., file size or name). Although objects are often of the type having items that can be counted, more generally objects may be virtually anything that can be tested for goodness of fit relative to one or more known categories, regardless of whether or not the objects. Examples of objects not having countable items includes prices, e.g., stock prices, voltages representing sounds, binary states, e.g., "1" or "0", "yes" or "no", etc., among many others.

Categorizing system 100 includes a Levine engine 118 that, in contrast to conventional categorization systems based on the vector space, statistical or Bayesian strategy discussed above in the Background section, is based on pattern matching. Empirical scientists use goodness-of-fit devices for comparing patterns found in data to patterns generated by models. These measures of goodness-of-fit assess the degree of match between patterns observed in data and patterns predicted by the logic of a model. These goodness-of-fit devices are distinct from the devices of the models themselves. They are not part of the logic of the model. Rather, they are used to assess the logic of the model. And, among models of the same complexity, the model capable of producing patterns that are the best fit to the patterns observed in data is, arguably, the best model.

Prior work by the present inventor ("Data Without Variables," Journal of Mathematical Sociology, Volume 23(3), 2001, pp 225-273, with Aaron Klein and James Mathews, and "Correlation and Objectivity," reviewed and accepted for publication in Sociological Methods and Research, forthcoming) has discovered testable models that are able to match patterns of word frequencies in different documents. This prior work does not categorize documents (in contrast to Levine engine 118), nor does it accept categorical or descriptive input from the analyst. What it does is to extract implicit continuous dimensions (not categories) of word usage, according to which documents are differentiated, and words differ.

This prior work by the present inventor accepts no categorical or dimensional input from the analyst. Rather, assuming such dimensions exist employs massive computation to solve for the dimensions, the geometry, and the model with respect to which data are related to the dimensions. The accuracy of one model as compared to another is assessed by goodness-of-fit. The profiles of data, including word frequency that are consistent with the model, are compared to the profiles that actually occur.

However, while this prior work does not use categories and, thus, does not directly compare with results of the mathematical and statistical procedures of the vector space, statistical, and Bayesian strategies discussed in the Background section above, it does put assumptions built in to these strategies to an empirical test. The evidence is that the assumptions are not valid, which implies, indirectly, that categorical methods based on these mathematical assumptions will be error prone and inefficient. The present inventor's prior work demonstrates that the standard devices for distinguishing between one vector that characterizes a document or a category and another vector that characterizes a document or a category make untested assumptions that the distances between vectors and angle between vectors follow "Euclidean" rules. The prior work also demonstrates that these rules do not apply. It demonstrates that standard statistical devices for measuring the "center" of a set of numbers and standard statistical devices for measuring deviations are only the best-known examples among infinitely many ways of defining a center or a deviation. Empirical work demonstrates better choices and demonstrates that the choice among them effects results of empirical investigation. It demonstrates that the standard statistical assumptions are inappropriate for text.

Levine engine 118 of the present invention is a new device for categorizing working objects 106 that is based on the discovery of an "end run" around the standard models (whose assumptions are known to be invalid) as well as the inventor's prior work (that detected these faults). The discovery leads to a method that goes directly to categorical results. It bypasses an explicit model, and, thus, it bypasses assumptions that are known to be incorrect (and likely to cause categorical errors-where these models used to be applied to the categorization of texts). Using Levine engine 118 it is possible to extract categorical information that would be visible in a "correct" map without ever producing the map. Application of Levine engine 118, discussed in more detail below, demonstrates the extraction of approximate categorical information by adapting goodness-of-fit criteria without actually producing the model that goodness-of-fit criteria are conventionally used to assess. For example, if the data profiles (referred to herein and in the appended claims as "object profiles" 124A-C) for two objects would place them "near" each other (in the unknown space), then the unknown model will predict that they have similar data. Thus, their similarity is detectable by a direct goodness-of-fit comparison of their data, without producing the devices of the mathematical, statistical, or probabilistic strategies.

Input/Output

Generally, Levine engine 118 has two modes, a learning mode 130 and a categorization mode 136. In learning mode 130 a collection of "training" objects 142, i.e., objects of known categorization, represented by a collection of object profiles 124A, 124B is input to Levine engine 118. At this point, each object profile 124A, 124B may be considered an $n \times 1$ (or $1 \times n$) vector of counts 148, wherein the number (n) of counts corresponds to the number of items to be used in the categorizing process. Prior to being input into Levine engine 118, training objects 142 are categorized into categories 112 based upon their content of items under consideration. This may be done manually, i.e., by one or more people assessing the training objects and determining the proper category for each, or automatically, e.g., using a conventional system, such as a Bayesian filter, or a system of the present invention, as long as Levine engine 118 was previously trained. Of course, the results of any automatic categorization should be verified.

Levine engine 118 may generate object profiles 124A, 124B by performing the counting, e.g., using a string matching algorithm, used to generate a count 148 for each item under consideration. Prior to application of Levine engine 118 to categorize working objects 106, counts 148 in object profiles 124A, 124B may be standardized or subjected to variance stabilizing transformation. For example, but not necessarily, counts may be reduced to percentages, to square roots, or by weights known from general item frequencies in a large collection of objects that may consist of, or include, training objects 142. These standardized counts (see, e.g., counts 400 of FIG. 4) may then be used in Levine engine 118. Those skilled in the art will readily understand how counts 148 may be subjected variance stabilizing transformation.

During learning mode 130, a specification of the known categories 112A, 112B of separate training objects 142 is also input into Levine engine 118 such that each object profile 124A, 124B is associated with its known category 112A, 112B. For example, if a particular training object 142 is known to be categorized in a category 112A, then the object profile 124A corresponding to that object is identified within Levine engine 118 as "belonging" to category 112A. The "output" from Levine engine 118 during learning mode 130 is a set of category profiles 154A, 154B, wherein each category profile corresponds to a respective one of categories 112A, 112B. Optionally, Levine engine 118 may also output a set of weights, described in more detail below, that may be used to refine the results achieved in categorization mode 136.

In categorization mode 136, one or more working objects 106 to be categorized, represented by corresponding object profile(s) 124C, are input to Levine engine 118, together with category profiles 154A, 154B and, optionally, weights, established in learning mode 130 for categories 112A, 112B. The optional weights may be determined by, first, computing for each working object 106 the goodness of fit determining the category profile, 154A or 154B, with which it has the best fit. Where some working objects 106 will by this criterion have a best fit to an inappropriate profile, weights may be introduced for each category, in this example 112A, 112B. Best fits are then recomputed using weighted best fits, optimizing for the best set of weights. The best set of weights is estimated by the criterion of least error of global classification. Classification errors themselves may be weighted so as to emphasize the undesirability of specific types of error such as false positives where the goal is to detect a class of spam mail.

Object profile(s) 124C may be generated in the same or similar manner as the manner described above relative to object profiles 124A, 124B of training objects 142. Levine engine 118 tests the empirical goodness of fit of each object profile 124C against object profiles 124A, 124B of training objects 142. The output from Levine engine 118 is, e.g., the estimated category(ies) 112A, 112B of each working object 106, together with supporting information describing its fit to each category, including the one with which it has the weighted best fit.

Internal Aspects of the Levine Engine

In both learning mode 130 and categorization mode 136, Levine engine 118 uses an implementation-dependent goodness-of-fit criterion. In one embodiment, two alternative goodness-of-fit criteria are used. One is a chi-square statistic modified to compensate for zero (and near zero) values in the denominator that would ordinarily leave the chi-square statistic undefined. In this embodiment, the chi-square statistic is bounded by a large positive constant, e.g., 1,000, to adjust for zero-valued expected values in the denominator. The other goodness-of-fit criterion is a started chi-square statistic, using a started value transformation known to provide more homoscedastic residuals. These goodness-of-fit criteria are discussed in more detail below relative to Implementations I and II, both directed to email spam filtering. Of course, those skilled in the art will readily appreciate that goodness-of-fit criteria suitable for use with the present invention are not limited to these two statistics, nor chi-square statistics in general. On the contrary, goodness-of-fit criteria may be any goodness-of-fit measure suitable to the particular implementation of the present invention. Generally, the choice of the goodness-of-fit measure and weights (discussed above), if used, will depend upon the particular implementation and empirical results.

Learning Mode

Figure 3:
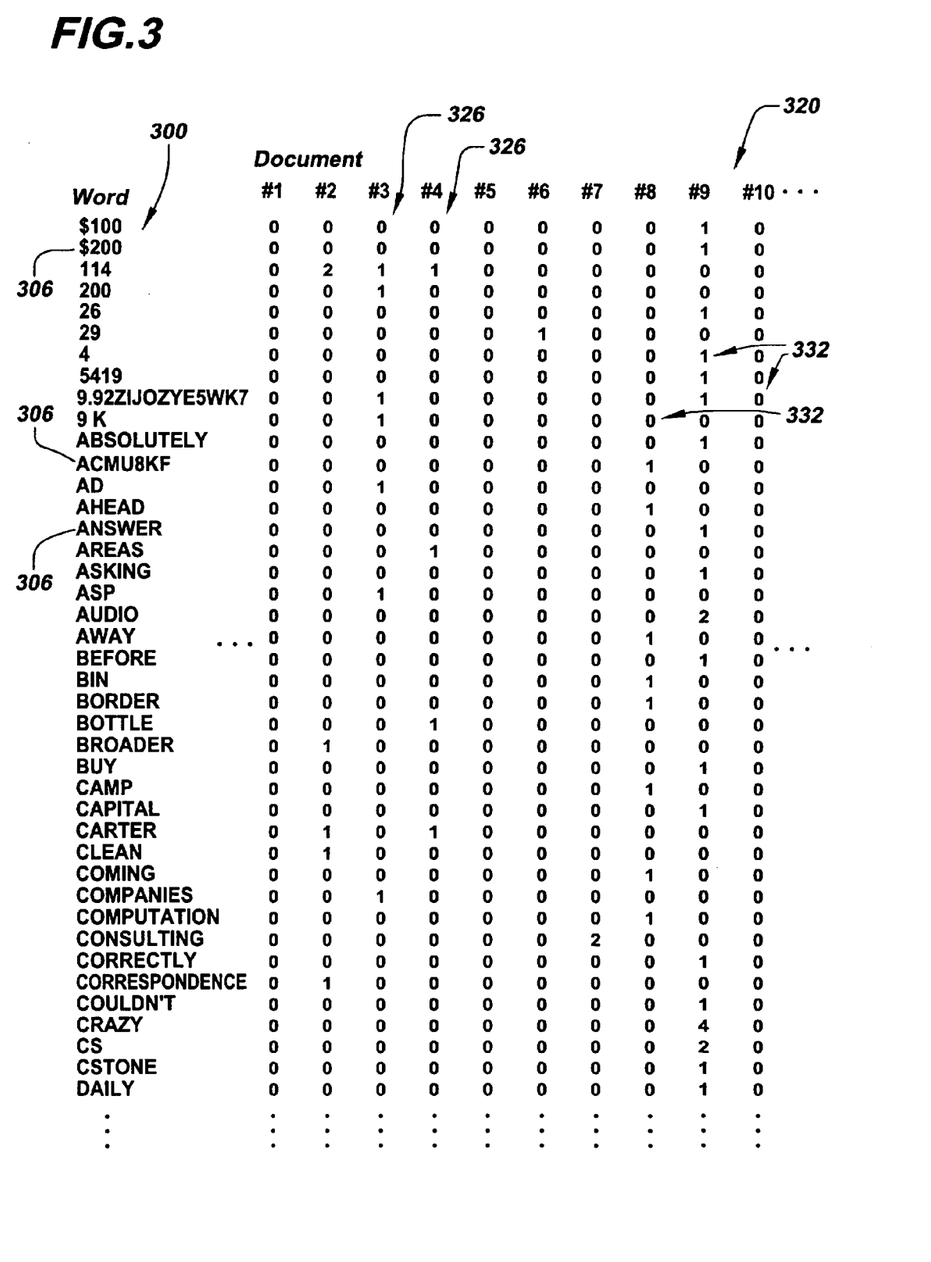
FIG. 3 is an excerpt from a table containing frequency counts for training messages (objects), contained in columns and words (items) contained in rows.

In learning mode 130, Levine engine 118 may generate a combined item list, e.g., combined item list 300 of FIG. 3, for all training objects 142 input to the engine. For example, if objects 106, 142 are email messages or other textual matter, items 306 may be words, groups of words, or character strings, among other things. Combined item list 300 may be generated in any of a number of ways in conjunction with, or independent of, the generation of object profiles 124A, 124B. In one embodiment wherein objects 106, 142 contain textual matter and items 306 are words, Levine engine 118 may identify each word in the corresponding object as an item. Then, combined item list 300 may be generated by combining the words generated for each object 142, listing each different word only once. This is an example in which combined item list 300 may be generated in conjunction with the generation of object profiles 124A, 124B.

Alternatively, an example of Levine engine 118 generating combined item list 300 independent of generating object profiles 124A, 124B is one in which the engine scans all of training objects 142 and implements an algorithm that identifies and lists all of the unique words (i.e., items 306) in all of these objects. In this example, Levine engine 118 may then use combined item list 300 to create object profiles for all training objects 142.

Once object profiles 124A, 124B have been input into Levine engine 118, the engine can then generate a category profile 154A, 154B for each category 112A, 112B. Generally, a category profile 154A, 154B of a category 112A, 112B is a list of numbers having the least error with respect to the corresponding counts (or percentages, frequencies, etc.) of all of the input object profiles 124A, 124B for that category. Where the goodness-of-fit statistic is a chi-square statistic, the category profile 154A, 154B of a category 112A, 112B is the solution to the equation looking for the least chi-square (summed) between an initial estimate profile 160A, 160B and all of object profiles 124A, 124B associated with that category. The exact means of solving for this best-fit category profile is immaterial to the present invention. However, it will typically be material to the quality of the results obtained by the present invention. In one application, each initial estimate profile 160A, 160B is computed from the mean, item 306 by item, of the counts of object profiles 124A, 124B for the training objects 142 of the corresponding category 112A, 112B. This initial estimate profile 160A, 160B is then improved by a greedy algorithm, e.g., a chi-square, or other, statistic, to arrive at the corresponding category profile 154A, 154B. The exact means of solving for this best-fit category profile is immaterial to the present invention. However, it will typically be material to the quality of the results obtained by the present invention.

As discussed above, after category profiles 154A, 154B have been estimated, Levine engine 118 may optionally assign a set of weights to each category profile. Again, a first estimate of errors of categorization may be computed by noting, for each training object 142, the category 112A, 112B with which it has the best fit. Then Levine engine 118 introduces weights for each category 112A, 112B and estimates the best set of weights, e.g., by the criterion of least error of global categorization. Categorization errors themselves may be weighted so as to emphasize the undesirability of specific types of error, such as false positives in the context of detecting the category of an email message.

Categorization Mode

In categorization mode 136, object profile 124C of a working object 106 is compared to each of category profiles 154A, 154B by computing its goodness-of-fit or weighted goodness-of-fit to the category profiles. The goodness-of-fit criterion for categorization may be the same goodness-of-fit criterion used during learning mode 130 discussed above. Levine engine 118 may then assign working object 106 to category 112A, 112B with which the working object has the better (best, if three or more categories are at issue) fit, as determined by the one of category profiles 154A, 154B with which object profile 124C of the working object has the better (best) fit. In addition, or alternatively, to indicating the category 112A, 112B with which working object 106 fits better (best), Levine engine 118 may report information regarding the goodness-of-fit for each category. Optionally, once a working object 106 has been categorized, Levine engine 118 may regenerate the category profile 154A, 154B corresponding to the category 112A, 112B into which that working object was just categorized, using the working object's object profile 124C in addition to the object profiles 124A or 124B previously used to generate that category profile.

Embodiments

Figure 2:
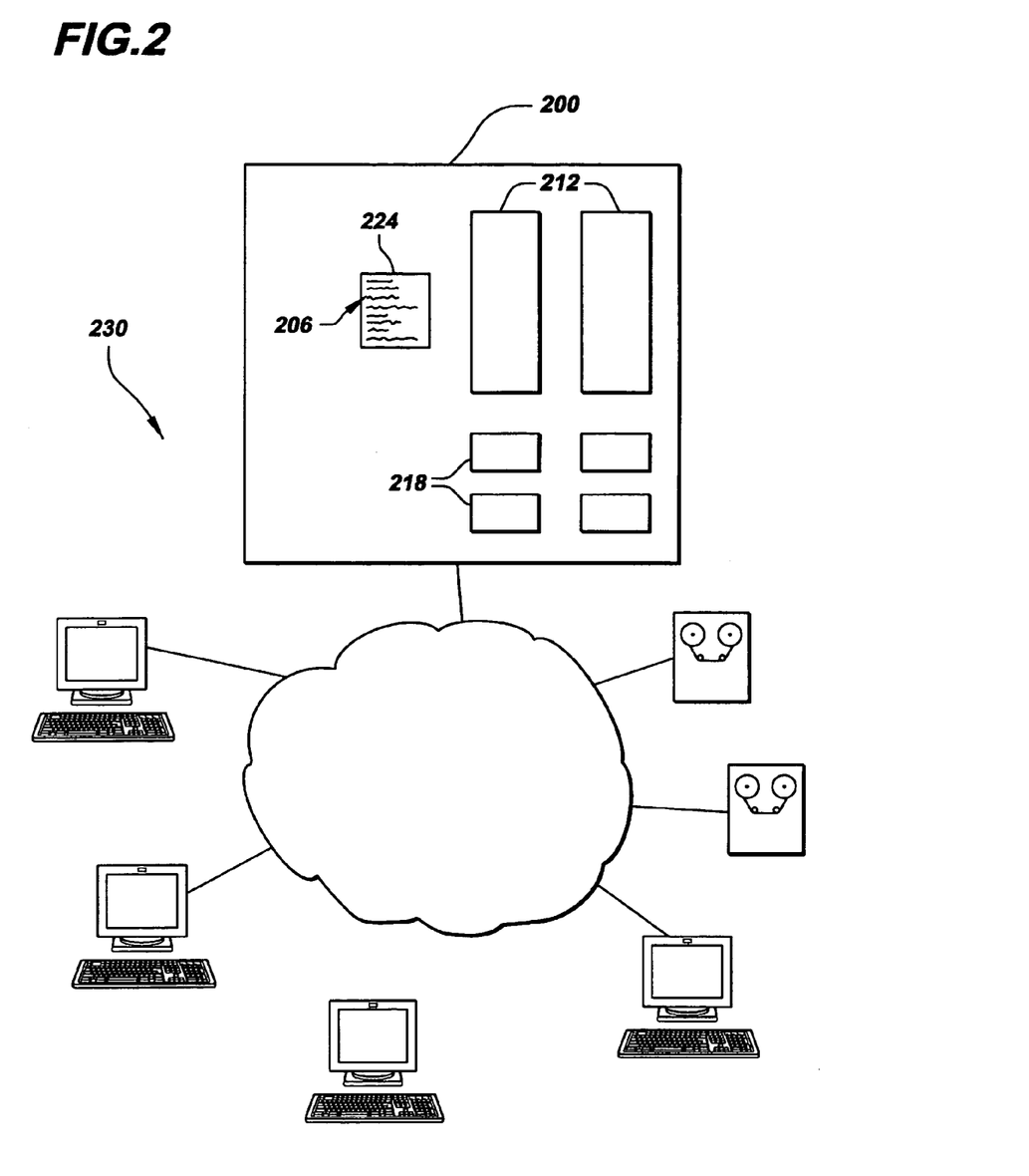
FIG. 2 is a high-level schematic diagram of a computer system implementing a Levine engine of the present invention.

Those skilled in the art will understand that a Levine engine of the present invention, such as engine 118 of FIG. 1, may be readily embodied in any of a wide variety of computer systems, such as computer system 200 of FIG. 2. That is, computer programmers skilled in the art can readily produce the computer instructions necessary to perform, among other things, any one or more of the following functions discussed above and below in connection with specific examples of the present invention:

(1) receiving and manipulating a plurality of training objects (e.g., training objects 142) and a plurality of working objects (e.g., working objects 106) to be categorized;

(2) receiving and manipulating information regarding a plurality of categories (e.g., categories 112A, 112B) to which the plurality of training objects belong and to which each of the plurality of working objects may be compared for goodness-of-fit;

(3) generating and manipulating an object profile (e.g., object profiles 124A, 124B, 124C) for each of the plurality of training objects and each of the plurality of working objects;

(4) standardizing the plurality of object profiles for each of the plurality of categories;

(5) generating and manipulating a category profile (e.g., 154A, 154B) for each of the plurality of categories;

(6) optimizing one or more of the category profiles, e.g., using a suitable measure of empirical goodness of fit applied to each category profile and the object profiles of the corresponding training objects;

(7) weighting one or more of the category profiles, e.g., with empirically derived weights;

(8) measuring and manipulating the goodness-of-fit information of the object profile of each working document with respect to each of the category profiles;

(9) determining and manipulating categorization information for each working object based on the goodness-of-fit information; and (10) presenting to one or more users, storing, or otherwise manipulating information relating to performing any one or more of functions (1)-(9) above.

There are many ways to structure the computer instructions 206 for these functions, e.g., applications, programs, routines, subroutines, modules, submodules, plug-ins, etc. Generally, the structure of the instructions will depend upon the architecture of computer system 200 in which Levine engine 118 will be implemented and the application(s) 212, module(s) 218, etc., e.g., document handling application, email application, etc., with which the categorizing must interact. It is not practical to list and describe all programming structures and environments for Levine engine 118. However, those skilled in the art will readily understand how to implement any one or more of the foregoing functions in a given programming structure and environment. Computer instructions 206 may be stored or otherwise contained on any suitable computer readable medium 224, such as a storage device, e.g., magnetic, optical, or electronic, or a computer readable signal, such as a data signal transmitted and received over a computer network 230.

EXAMPLES

Following are two exemplary implementations of an object categorizing system of the present invention, e.g., system 100 of FIG. 1. Both implementations are directed to the filtering of email messages that a user does not desire to read, i.e., "spam," to separate the spam from the messages that the user desires to read, hereinafter "not spam." Consequently, both of these implementations utilize only two categories. Of course, as discussed above, an object categorizing system of the present invention may utilize more than two categories. The number of categories for any given application will generally be dependent upon the application and the results desired for that application.

Those skilled in the art will also appreciate that even in a spam filtering context, more than two categories may be used. Another implementation may utilize the categories "spam," "not spam," "neither," and "both." Here, the choice of the number of categories generally depends upon how the implementer desires the working objects to be categorized. In addition, while email filtering would be a presently-popular application for an object categorizing system of the present invention, those skilled in the art will readily recognize that the invention is by no means limited to such an application. As mentioned above, virtually any sort of object capable of being categorized and having items that can be counted may be characterized using the present invention. Based on this broad criteria, the number of applications of the present invention is large, and many of these applications will be apparent to skilled artisans. Consequently, it is not

IMPLEMENTATION I

Learning Mode

This example used 1130 email messages (objects), 854 messages for learning plus 276 messages to test what categorizing system inferred from the 854 training message. Of the 854 training messages, 536 messages were classified as spam, 318 messages were classified as not spam, where the sole criterion for categorization as "not spam" or "spam" was the personal preference of a user who does or does not want to read a particular email for any reason. (For example, some advertisements and some mass mailings are present in both the "not spam" and "spam" categories.) The messages were categorized based on the words (items) appearing therein.

Figure 4:
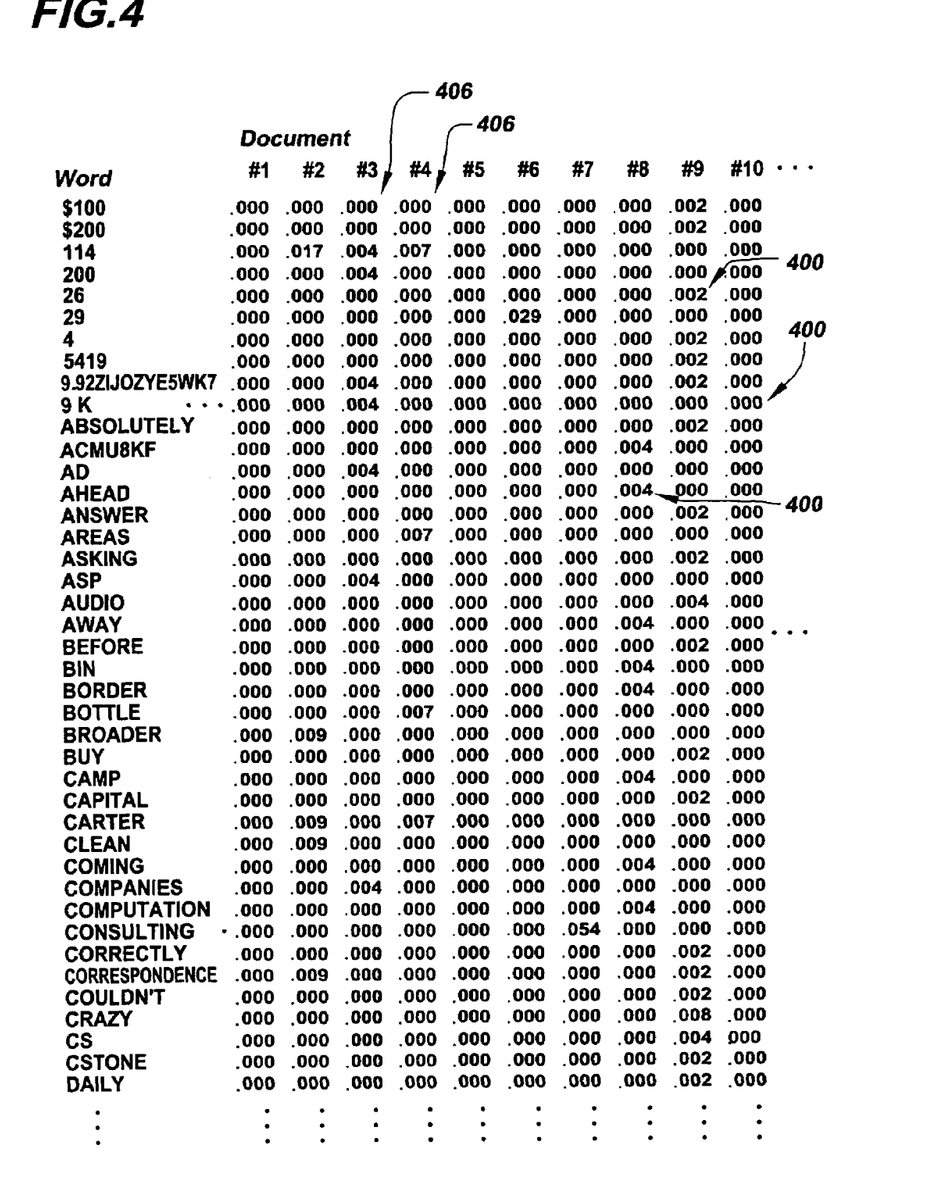
FIG. 4 is an excerpt from a table containing standardized values of the frequency counts of the table of FIG. 3.

Data for training were prepared, first as a table 320 (FIG. 3) of message profiles 326 each containing 2515 counts 332 (corresponding to the 2515 unique words contained in the messages) that each indicate the number of times the corresponding word (item 306) appears in the respective message. Table 320 was 854 columns by 2515 rows, corresponding to the 854 messages and 2515 unique items 306 found in the 854 messages. The numerals in separate messages profiles (i.e., separate columns) are the word counts 332 for each of the items in each of the separate messages. The data were further prepared by converting counts 332 within each messages profile 326 to percentages for that message. These converted message profiles 406 are shown in FIG. 4. These converted messages profiles were then transferred to Levine engine 118 (FIG. 1) together with the users categorization, "not spam" or "spam," for each of the 854 messages.

Initial Estimates of Category Profiles

From these 854 messages, Levine engine 118 computed initial estimates of two 2514 element category profiles (not shown), each of which represented a corresponding one of the two categories, "not spam" and "spam." In this implementation, these initial estimates were the averages across the messages, using simple arithmetic means, word by word. For the initial estimate of the category profile for the "spam" category, the estimate was the average across the 536 spam messages. For the initial estimate of the category profile for the "not spam" category, the estimate was the average across the 276 not spam messages.

Optimized Estimates of Category Profiles

Figure 5:
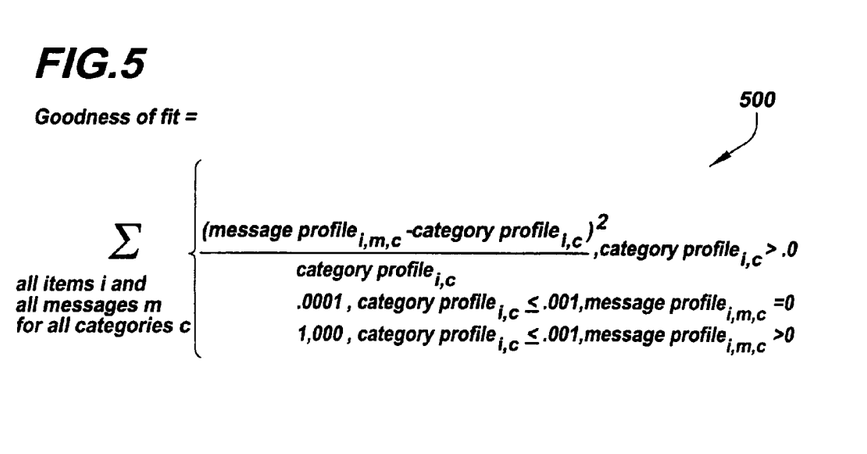
FIG. 5 shows the modified chi-square statistic used in Implementation I to optimize the category profiles of "not spam" and "spam" categories.

Using the modified chi-square computation 500 indicated in FIG. 5, for each category the sum of errors was computed, summing over all words for all messages in that category. Estimates of the category profiles were revised to those values for which this sum of chi-square errors relative to the corresponding respective message profiles was optimized (minimized).

Secondary Optimization of Error and Categorization of Test Messages

Each of the test messages was classified by comparing weighted values of the sum of error with respect to each of the category profiles. Secondary optimization was achieved by adjusting the two weights to reduce the sum of the percentage of spam messages that were falsely classified as not spam plus 1000 times the percentage of not spam messages that are falsely classified as spam.

Figure 6:
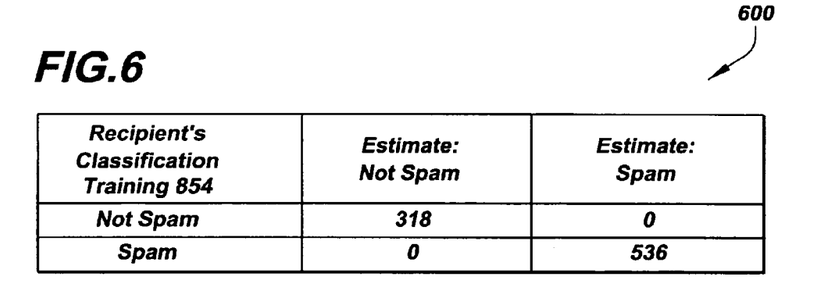
FIG. 6 is a table showing the estimated categorizations of the training messages of Implementation I.

Applying a weight of 1 to the error with respect to the category profile for the "spam" category and a weight of 1.12 to the error with respect to the category profile for the "not spam" category, achieved the least weighted secondary error, achieving the estimated categorizations shown in Table 600 of FIG. 6. For the training messages in this implementation, the learning estimates reduced error to zero, as seen in Table 600.

Categorization/Test Mode

Input

Message profiles (not shown) for the 276 test messages were prepared by the same devices used to prepare the message profiles of the 854 training messages, except that new words present in the test messages but not present in the 854 training messages were discarded.

Categorization

Figure 7:
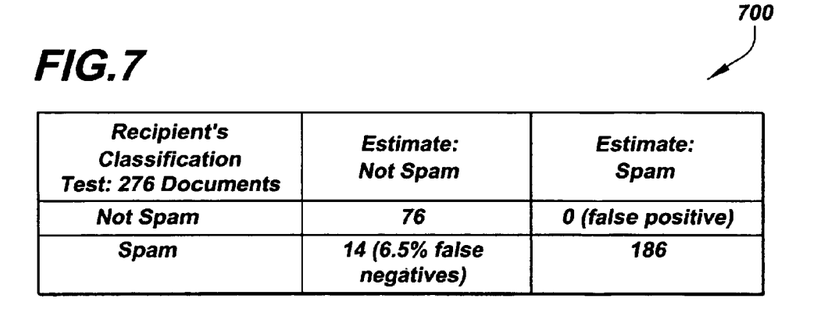
FIG. 7 is a table showing the estimated categorizations of the test messages of Implementation I.

Each of the 276 test message profiles was compared to each of the category profiles inferred from the 854 training messages in learning mode 130. Levine engine 118 assigned each test message to the category with which it has the weighted lesser error, applying weight 1 to that message's error with respect to the category profile of the spam messages and weight 1.2 to that message's error with respect to the category profile of the not spam messages. The result was the estimated categorizations shown in table 700 of FIG. 7. Table 700 shows no errors in which a not spam message was falsely classified as spam, while 6.5% of the spam messages passed (incorrectly) as not spam.

Figure 8:
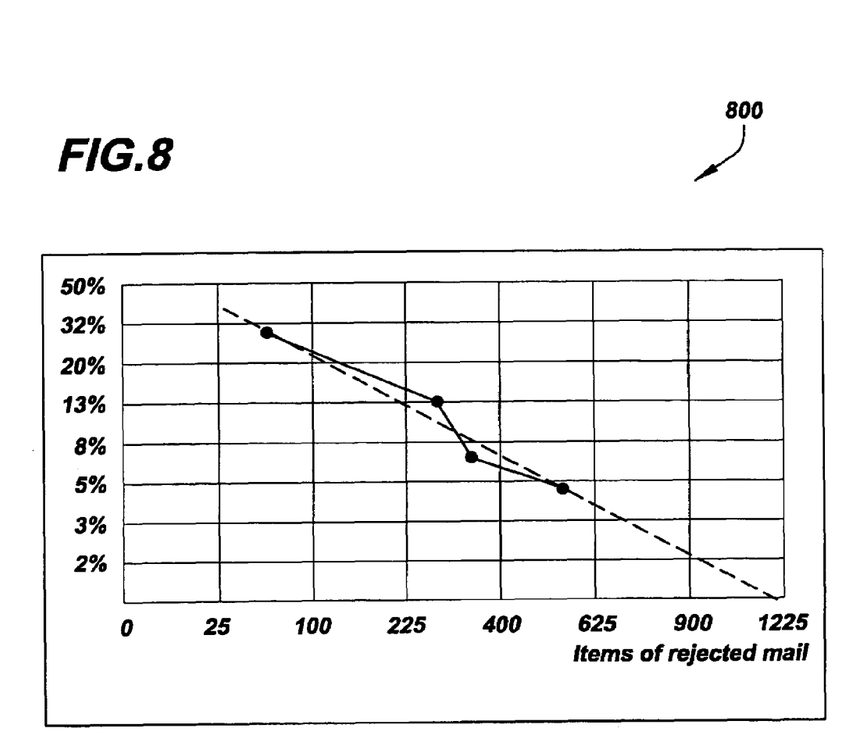
FIG. 8 is a graph showing the empirical relation and projected relation between error (percent of test messages falsely categorized as not spam) and the number of training messages.

Projecting from smaller samples, as well as the test sample, above, and extrapolating to larger samples, the graph 800 of FIG. 8 demonstrates that there was a smooth relation between the number of spam messages in the learning set and the error rate (falsely classifying spam messages as not spam). Again, none of the not spam messages was falsely classified as a spam message.)

Figure 9A:
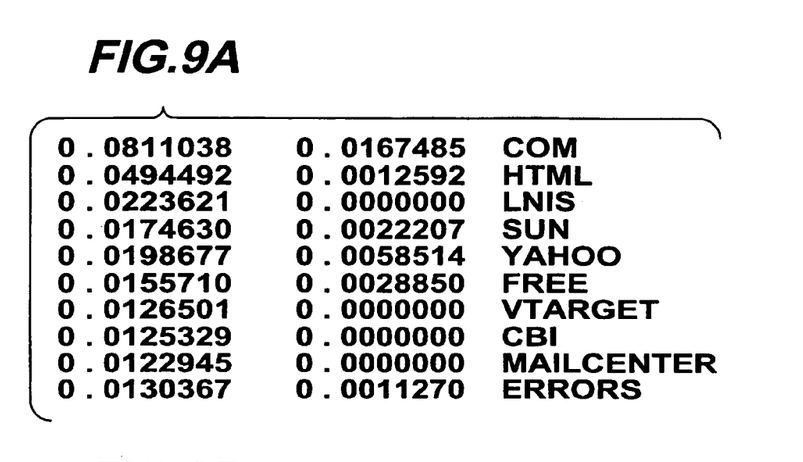
FIGS. 9A-9C each show an excerpt from the "not spam" category profile and an excerpt from the "spam" category profile for a set of ten words, wherein the sets of ten words correspond to different locations within the category profiles.
Figure 9B:
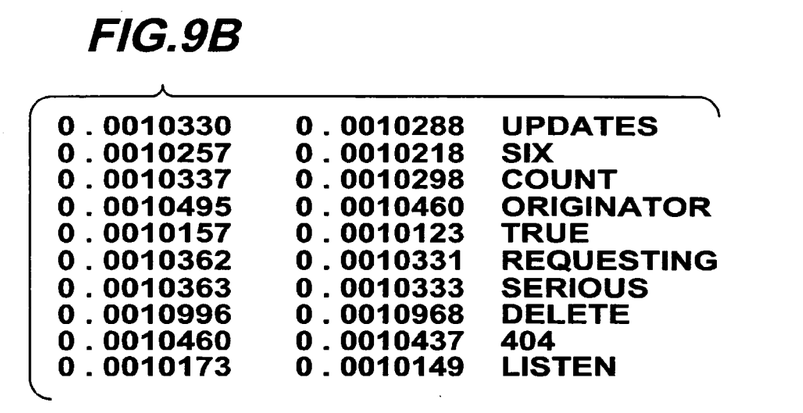
Figure 9C:
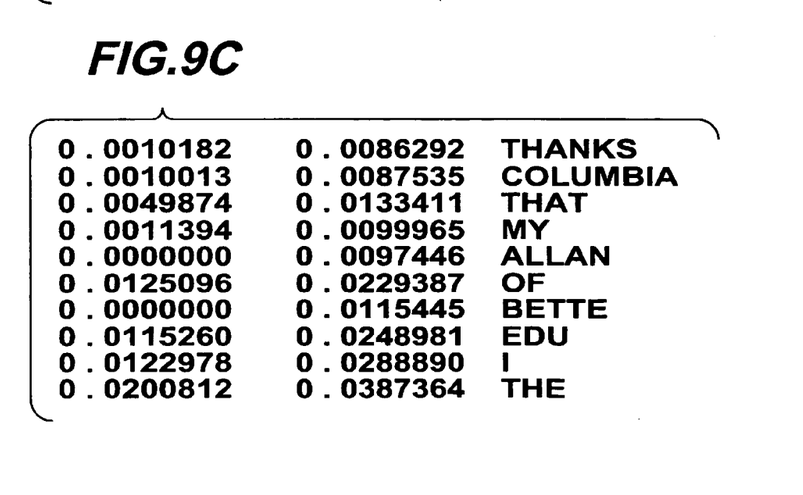

FIGS. 9A-9C demonstrate elements of the category profiles, showing category profile values corresponding to 30 of the 2514 words. The first 10 words (FIG. 9A) demonstrate relatively large values for words associated with spam messages. The next 10 words (FIG. 9B) demonstrate little differentiation of words as between spam and not spam messages (and could have been omitted from the categorization computation). The last 10 words (FIG. 9C) demonstrate relatively large values for words associated with not spam messages.

IMPLEMENTATION II

Learning Mode

This second implementation demonstrates variants relative to Implementation I, above, using the same 1130 e-mail messages. In Implementation II, the data were prepared in the same manner as the data in Implementation I, i.e., as a table 320 of message profiles 326, 2515 by 854 in size, as illustrated in FIG. 3. In this implementation, further preparation, e.g., converting counts to percentages, was not used. Message profiles 326, together with the user's categorization, i.e., "not spam" or "spam" was transferred to the second implementation of Levine engine 118.

Initial Estimates of Category Profiles

In this implementation, initial estimates of the category profiles (not shown) for "not spam" and "spam" categories were estimated, word by word, by the square root of the mean squared word count, using the square root as a stabilizing transformation.

Optimized Estimates of Category Profiles

Figure 10:
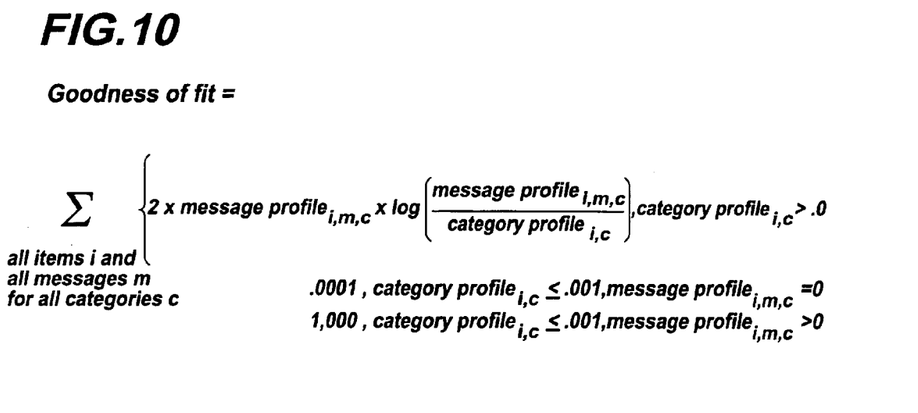
FIG. 10 shows the modified maximum likelihood goodness-of-fit used in Implementation II to optimize the category profiles of "not spam" and "spam" categories.

As in Implementation I, above, message profiles of the 854 training messages were compared to their respective category profiles by a goodness-of-fit measure. In Implementation I, the measure was a modified chi-square measure of goodness/badness of fit. In Implementation II, the measure was a modified maximum likelihood measure of goodness-of-fit. The measure 1000 for Implementation II is shown in FIG. 10. Substituting maximum likelihood for chi-square, categorization is estimated to match the category with which the message profile has the smallest weighted sum of the modified maximum likelihood errors.

As a further variant, where Implementation I optimized category profiles by the criterion of weighted least chi-square error, Implementation II optimized by goodness-of-fit to the known categorizations of the 854 training messages. Specifically, "error" was scored as the weighted sum of the percentages of the two types of error. Categorization error was operationalized as a sum, i.e., the percentage of spam messages falsely classified as not spam plus 1000 times the percentage of "not spam" messages falsely classified as spam. (The weight of "1000" assigns a high cost to false positives as compared to false negatives.) In Implementation II, optimization optimizes the goodness-of-fit of the categorization, according to this measure.

Figure 11:
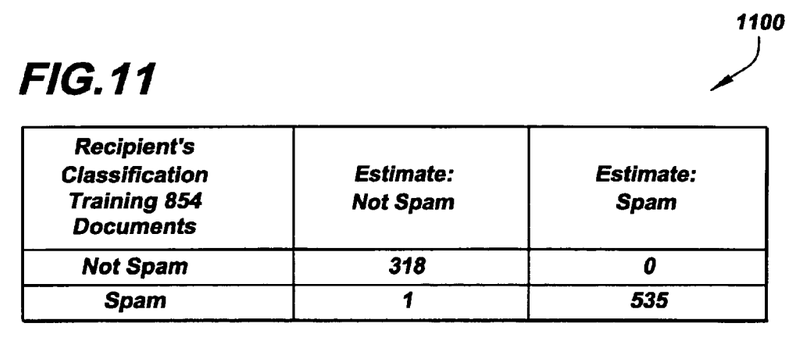
FIG. 11 is a table showing the estimated categorizations of the training messages of Implementation II.

For the 854 training messages, optimization provided the learning estimates shown in Table 1100 of FIG. 11. In this example, one spam training message was falsely associated with the "not spam" category.

Categorization/Test Mode

Input

The 276 test messages were prepared by the same devices used for the learning set, with the omission of words not present in the original 854 messages.

Categorization

Figure 12:
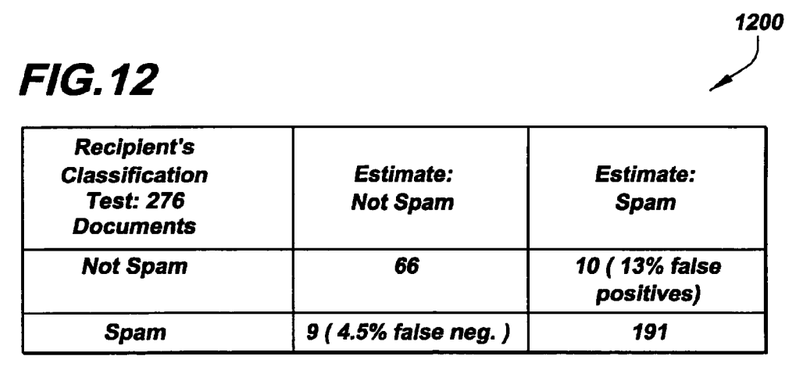
FIG. 12 is a table showing the estimated categorizations of the test messages of Implementation II.

Each of the 276 test messages was compared to each of the category profiles, and classified according to the smaller of its maximum likelihood errors with respect to the previously estimated category profiles. The resulting test categorization is shown in the table of FIG. 12. Among 200 spam messages, 9 were falsely classified as not spam. Among 76 not spam messages, 10 were falsely classified as spam.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A computer-implemented method of classifying a working object among a plurality of categories, each of the plurality of categories having a category profile including a plurality of category statistical values, each of the plurality of category statistical values relating to a countable item of a set of countable items, the method comprising:

providing a working object to be categorized;

producing a working object profile for said working object by determining a frequency of occurrence in said working object of each countable item of the set of countable items;

determining a first chi-square statistical value for each category of the plurality of categories, each of said first chi-square statistical values based on the sum of a plurality of relationships, wherein each of the plurality of relationships is based on the difference of a frequency of occurrence for a countable item in said working object profile and a corresponding one of the plurality of category statistical values of the corresponding category profile divided by the corresponding one of the plurality of category statistical values; and generating a categorization for said working object in the one of the plurality of categories having the lowest corresponding first chi-square statistic value.

2. A computer-implemented method according to claim 1, wherein said determining a first chi-square statistical value comprises applying a modified chi-square statistic.

3. A computer-implemented method according to claim 1, wherein said determining a first chi-square statistical value comprises modifying a chi-square statistical value to correct for zero-valued denominator values that may result in an undefined chi-square statistical value.

4. A computer-implemented method according to claim 1, wherein said determining a first chi-square statistical value comprises utilizing a started chi-square statistic having a started value transformation configured to provide homeoscedastic residuals.

5. A computer-implemented method according to claim 1, wherein each of the plurality of category statistical values includes a least chi-square value.

6. A computer-implemented method according to claim 5, wherein said least chi-square value is determined by a method comprising:

providing a first plurality of training object profiles corresponding to a first category of the plurality of categories, each of said first plurality of training object profiles including a frequency of occurrence value for each of the countable items in the set of countable items;

determining a plurality of estimated values for a best fit frequency for a first one of the countable items across the first plurality of training object profiles;

determining a second chi-square statistical value for each of the plurality of estimated values with respect to the corresponding frequency of occurrence values of the first plurality of training object profiles for the first one of the countable items; and assigning the estimated value corresponding to the lowest of said second chi-square statistical values as the least chi-square value for the first one of the countable items.

7. A computer-implemented method according to claim 6, wherein said determining a second chi-square statistical value includes:

subtracting a first one of said plurality of estimated values from each frequency of occurrence value of the first plurality of training object profiles;

squaring the result of said subtracting step for each frequency of occurrence value;

dividing the result of said squaring step by said first one of said plurality of estimated values for each frequency of occurrence value; and summing the resultant values of said dividing step.

8. A computer-implemented method according to claim 6, wherein said determining a plurality of estimated values includes determining a square root of the mean squared of the frequency of occurrence values across the first plurality of training object profiles.

9. A computer-implemented method according to claim 1, further comprising assigning a set of weights to each of the category profiles of the plurality of categories, the weights being utilized in determining the lowest corresponding first chi-square statistical value in the step of generating a categorization for said working object.

10. A computer-implemented method according to claim 1, wherein each of said frequency of occurrence includes a proportional value with respect to other frequency of occurrence values in the set of countable items.

11. A computer-implemented method according to claim 1, wherein the category profiles of the plurality of categories are configured from a plurality of training objects, the set of countable items including all countable items from the plurality of training objects.

12. A computer-implemented method of classifying a working object among a plurality of categories, the method comprising:

providing a first plurality of training object profiles corresponding to a first category of the plurality of categories, each of said first plurality of training object profiles including a frequency of occurrence value for each countable item in a set of countable items; determining a plurality of estimated values for a best fit frequency for each of the countable items across the first plurality of training object profiles;

determining a first chi-square statistical value for each of the plurality of estimated values with respect to the corresponding frequency of occurrence values of the first plurality of training object profiles for each of the countable items, wherein each first chi-square statistical value is based on a sum of a plurality of relationships, each relationship based on the square of a difference of one of the frequency of occurrence values for the corresponding countable item of the plurality of training object profiles and a corresponding respective one of the plurality of estimated values divided by the corresponding respective one of the plurality of estimated values; and generating a first category profile for said first category, said first category profile including an optimized estimated value that is the estimated value corresponding to the lowest of said first chi-square statistical values for each of the countable items in the set of countable items.

13. A computer-implemented method according to claim 12, further comprising: providing a second plurality of training object profiles corresponding to a second category of the plurality of categories, each of said second plurality of training object profiles including a frequency of occurrence value for each of countable items in a set of countable items;

determining a plurality of estimated values for a best fit frequency for each of the countable items across the second plurality of training object profiles;

determining a second chi-square statistical value for each of the plurality of estimated values with respect to the corresponding frequency of occurrence values of the second plurality of training object profiles for each of the countable items; and generating a second category profile for said second category, said second category profile including an optimized estimated value that is the estimated value corresponding to the lowest of said second chi-square statistical values for each of the countable items in the set of countable items.

14. A computer-implemented method according to claim 12, wherein said determining a plurality of estimated values includes determining a square root of the mean squared of the frequency of occurrence values across the first plurality of training object profiles.

15. A computer-implemented method according to claim 13, further comprising:

providing a working object to be categorized;

producing a working object profile for said working object by determining a frequency of occurrence in said working object of each countable item of the set of countable items;

determining a second chi-square statistical value for each category of the plurality of categories, each of said second chi-square statistical values based on a plurality of relationships, wherein each of the plurality of relationships is between a frequency of occurrence for one of the countable items in said working object profile and a corresponding optimized estimated value; and generating a categorization for said working object in the one of the plurality of categories having the lowest corresponding second chi-square statistical value.

16. A computer-implemented method according to claim 15, wherein said determining a second chi-square statistical value comprises:

subtracting said optimized estimated value for each countable item from said corresponding frequency of occurrence;

squaring the result of said subtracting step for each countable item;

dividing the result of said squaring step by said optimized estimated value for each countable item; and summing the resultant values of said dividing step.

17. A computer-implemented method according to claim 15, wherein said determining a first chi-square statistical value comprises applying a modified chi-square statistic.

18. A computer-implemented method according to claim 12, further comprising assigning a set of weights to each of the category profiles of the plurality of categories, the weights being utilized in determining the lowest corresponding first chi-square statistical value in the step of generating a categorization for said working object.

19. A computer-readable medium including computer-executable instructions for performing a method of classifying a working object among a plurality of categories, each of the plurality of categories having a category profile including a plurality of category statistical values, each of the plurality of category statistical values relating to a countable item of a set of countable items, the instructions comprising:

a set of instructions for providing a working object to be categorized;

a set of instructions for producing a working object profile for said working object by determining a frequency of occurrence in said working object of each countable item of the set of countable items;

a set of instructions for determining a first chi-square statistical value for each category of the plurality of categories, each of said first chi-square statistical values based on the sum of a plurality of relationships, wherein each of the plurality of relationships is based on the difference of a frequency of occurrence for a countable item in said working object profile and a corresponding one of the plurality of category statistical values of the corresponding category profile divided by the corresponding respective one of the plurality of category statistical values; and a set of instructions for generating a categorization for said working object in the one of the plurality of categories having the lowest corresponding first chi-square statistical value.

20. A computer-readable medium according to claim 19, wherein said set of instructions for determining a first chi-square statistical value comprises a set of instructions for applying a modified chi-square statistic.

21. A computer-readable medium according to claim 19, wherein said set of instructions for determining a first chi-square statistical value comprises a set of instructions for applying a chi-square statistical value modified to correct for zero-valued denominator values that may result in an undefined chi-square statistical value.

22. A computer-readable medium according to claim 19, wherein said set of instructions for determining a first chi-square statistical value comprises a set of instructions for utilizing a started chi-square statistic having a started value transformation configured to provide homeoscedastic residuals.

23. A computer-readable medium according to claim 19, further comprising: a set of instructions for providing a first plurality of training object profiles corresponding to a first category of the plurality of categories, each of said first plurality of training object profiles including a frequency of occurrence value for each of the countable items in the set of countable items;
   a set of instructions for determining a plurality of estimated values for a best fit frequency for a first one of the countable items across the first plurality of training object profiles;
   a set of instructions for determining a second chi-square statistical value for each of the plurality of estimated values with respect to the corresponding frequency of occurrence values of the first plurality of training object profiles for the first one of the countable items;
   a set of instructions for assigning the estimated value corresponding to the lowest of said second chi-square statistical values as a category statistical value for the first one of the countable items.

24. A computer-readable medium according to claim 23, wherein said set of instructions for determining a second chi-square statistical value includes:
   a set of instructions for subtracting a first one of said plurality of estimated values from each frequency of occurrence value of the first plurality of training object profiles;
   a set of instructions for squaring the result of said subtracting step for each frequency of occurrence value;
   a set of instructions for dividing the result of said squaring step by said first one of said plurality of estimated values for each frequency of occurrence value; and
   a set of instructions for summing the resultant values of said dividing step.

25. A computer-readable medium according to claim 23, wherein said set of instructions for determining a plurality of estimated values includes a set of instructions for determining a square root of the mean squared of the frequency of occurrence values across the first plurality of training object profiles.

26. A computer-readable medium according to claim 19, further comprising a set of instructions for assigning a set of weights to each of the category profiles of the plurality of categories, the weights being utilized in determining the lowest corresponding first chi-square statistical value in the set of instructions for generating a categorization for said working object.

27. A computer-readable medium including computer-executable instructions for performing of classifying a working object among a plurality of categories, the instructions comprising:
   a set of instructions for providing a first plurality of training object profiles corresponding to a first category of the plurality of categories, each of said first plurality of training object profiles including a frequency of occurrence value for each of countable items in a set of countable items;
   a set of instructions for determining a plurality of estimated values for a best fit frequency for a each of the countable items across the first plurality of training object profiles;
   a set of instructions for determining a first chi-square statistical value for each of the plurality of estimated values with respect to the corresponding frequency of occurrence values of the first plurality of training object profiles for each of the countable items, wherein each first chi-square statistical value is based on a sum of a plurality of relationships, each relationship based on the square of a difference of one of the frequency of occurrence values for the corresponding countable item of the plurality of training object profiles and a corresponding respective one of the plurality of estimated values divided by the corresponding respective one of the plurality of estimated values;
   and a set of instructions for generating a first category profile for said first category, said first category profile including an optimized estimated value that is the estimated value corresponding to the lowest of said first chi-square statistical values for each of the countable items in the set of countable items.

28. A computer-readable medium according to claim 27, further comprising:
   a set of instructions for providing a working object to be categorized;
   a set of instructions for producing a working object profile for said working object by determining a frequency of occurrence in said working object of each countable item of the set of countable items;
   a set of instructions for determining a second chi-square statistical value for each category of the plurality of categories, each of said second chi-square statistical values based on a plurality of relationships, wherein each of the plurality of relationships is between a frequency of occurrence for one of the countable items in said working object profile and a corresponding optimized estimated value; and
   a set of instructions for generating a categorization for said working object in the one of the plurality of categories having the lowest corresponding second chi-square statistical value.

* * * * *